Jan. 4, 1944.  J. W. STAGGERS  2,338,307
PIPE COUPLING
Filed Sept. 15, 1942   2 Sheets-Sheet 1
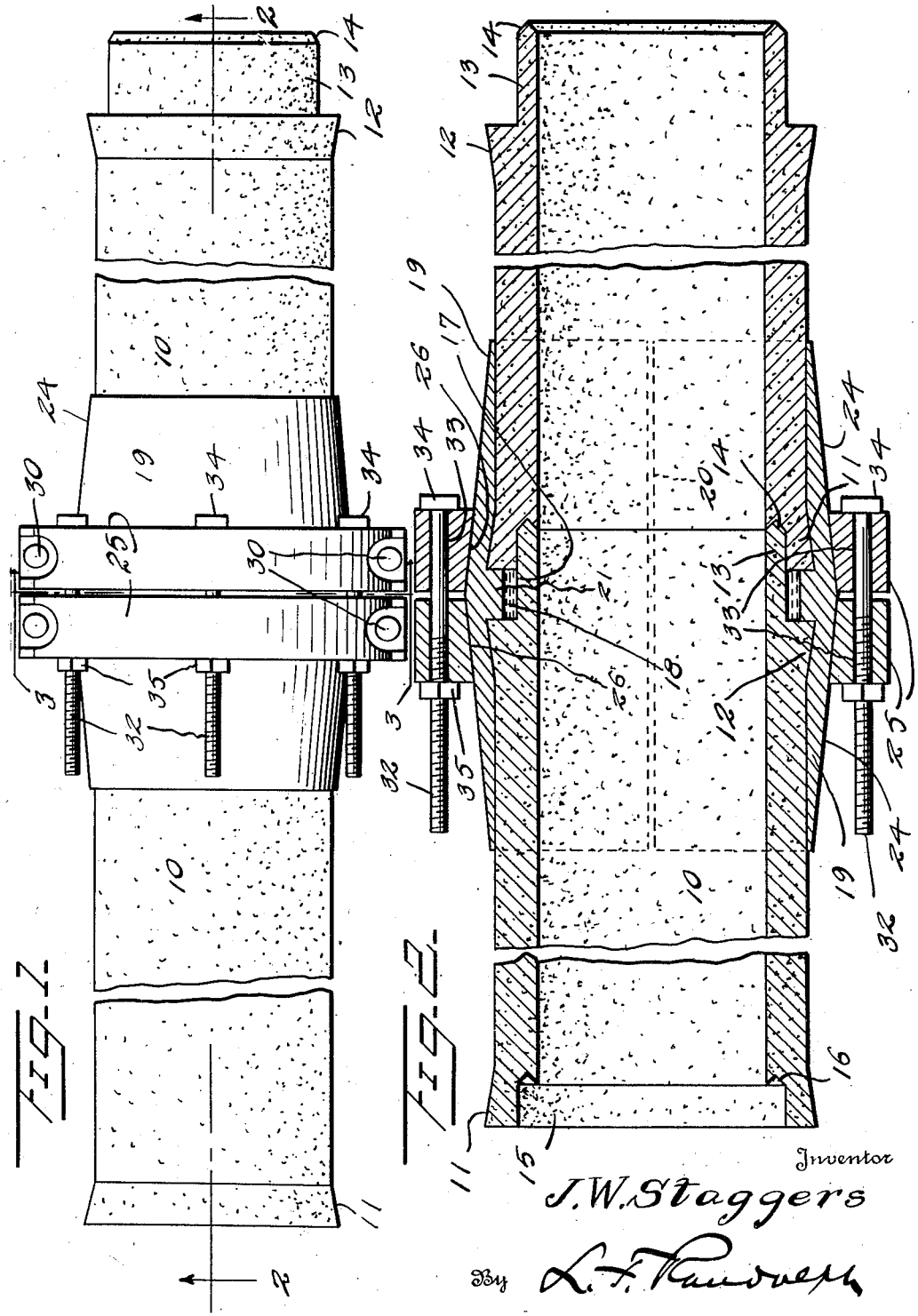
Inventor
J. W. Staggers
By [signature]
Attorney

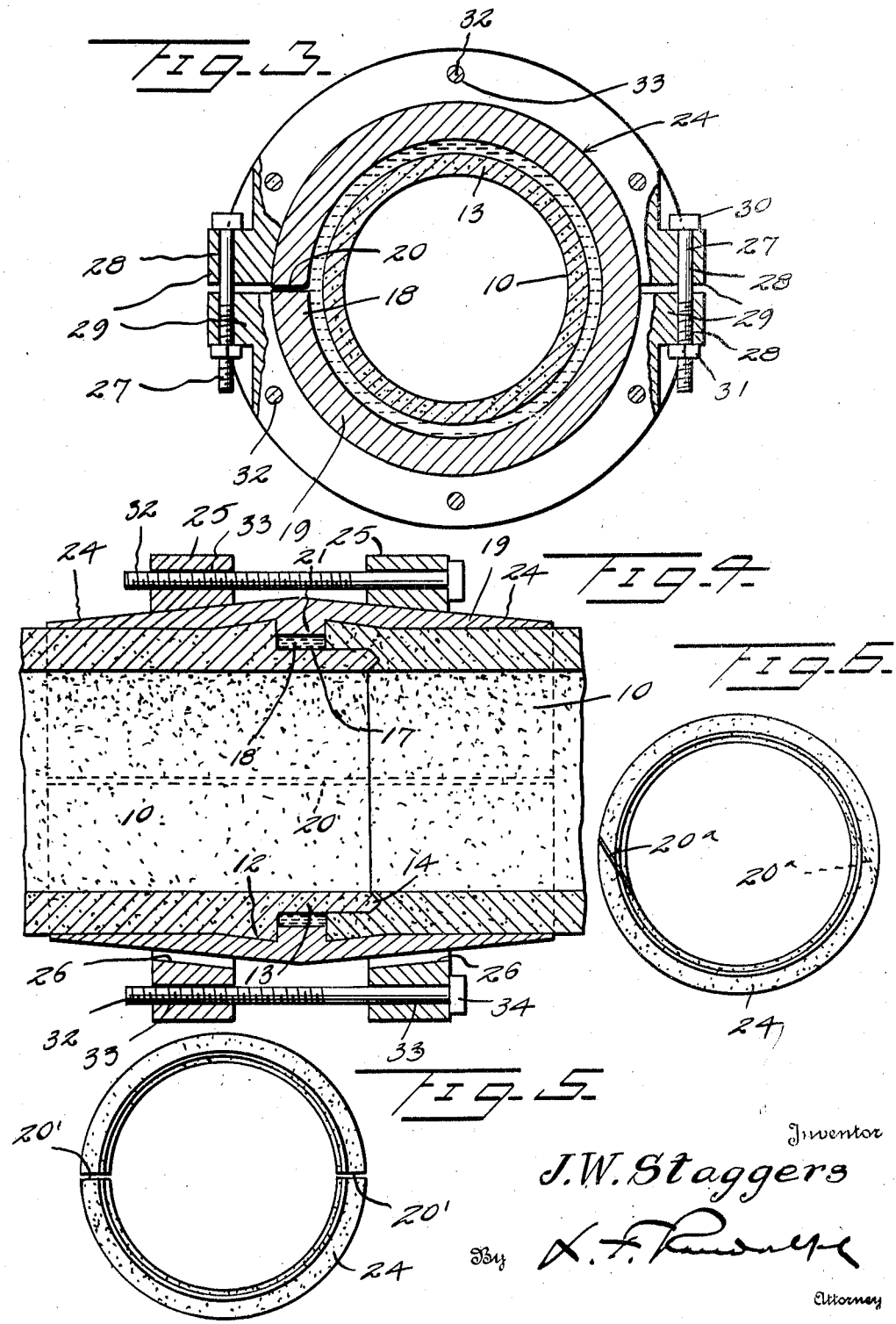

Patented Jan. 4, 1944

2,338,307

UNITED STATES PATENT OFFICE 2,338,307

PIPE COUPLING

John W. Staggers, Washington, D. C.

Application September 15, 1942, Serial No. 458,368

4 Claims. (Cl. 285—132)

This invention relates to a pipe joint or coupling.

It is particularly aimed to provide a construction of joint or coupling for sections or lengths of pipe, such as cement pipe, which includes a novel clamping sleeve contracted about the pipe sections or lengths, coacting with means on the latter to draw them together, and coacting with means to retain a sealing medium which remains liquid, tacky or permanently effective in order to seal the joint especially if relative movement of the pipe sections or lengths should occur during use.

The more specific objects and advantages will become apparent from a consideration of the description following taken in connection with accompanying drawings illustrating an operative embodiment.

In said drawings—

Figure 1 is a view in elevation showing lengths or sections of pipe connected by my invention;

Figure 2 is a longitudinal sectional view taken on the line 2—2 of Figure 1;

Figure 3 is a transverse sectional view taken on the line 3—3 of Figure 1;

Figure 4 is a fragmentary longitudinal sectional view similar to Figure 2 but showing the use of a modified form of clamping means;

Figure 5 is an end elevation of one form of coupling sleeve and

Figure 6 is an end elevation of a final form of split coupling sleeve which may be used.

Referring specifically to the drawings wherein like reference characters designate like or similar parts, two lengths or sections of pipe are illustrated at 10 and are to be taken as conventional and of any desired size, being made for instance of concrete. At one end, said pipe sections are outwardly flared or tapered at portions 11 and at their other ends, they are in the reverse direction similarly outwardly flared or tapered at portions 12. Beyond the portions 12, end portions 13 project from the pipe, being of reduced diameter and preferably terminally of wedge or pointed shape as at 14.

The opposite ends of the pipe sections 10 are interiorly channeled or cut away at 15, to a less depth than the length of the extensions 13 but of approximately the same diameter so that the extensions will enter the channels 15 with the wedge terminals 14 in engagement with correspondingly shaped grooves 16 that begin at terminals of the channels.

It will be noted that the extensions 13 cannot be entirely accommodated within the channels 15 and hence when adjacent pipes or sections are joined, an outer circumferential groove 17 is provided and such groove constitutes a reservoir for sealing compound 18 which preferably is of such nature as to remain permanently liquid, viscid or tacky, to effectively seal all adjacent joints, and especially should the pipe sections have relative movement after continued use, will automatically adapt itself to the changed position of the pipe sections and maintain them effectively joined and sealed.

Disposed around the interfitted ends of the pipe sections and extending a distance therefrom is a coupling sleeve 19 which may be of metal, a suitable plastic or the equivalent. As shown in Figure 3, in particular, coupling sleeve 19 may be in a single piece having a single split at 20 on a line diametrically of the pipe. Such sleeve interiorly and centrally has an inwardly extending continuous rib 21 of less depth than that of the reservoir or groove 18 and extending into the latter. Otherwise the inner surface of the coupling sleeve 19 conforms to the adjacent outer surface portions of the pipes or sections 10 in that surface portions 22 thereof are cylindrical concentrically with the center of the pipe and surface portions 23 thereof are outwardly tapered in opposite direction.

Exteriorly, the coupling sleeve 19 has diverging tapered surfaces at 24 to each of which a clamping ring 25 is removably applied, preferably having internal tapered surfaces 26 on angles corresponding to the tapered surfaces 24. The clamping rings 25 may be made in one or more pieces as preferred but as shown, are made in halves which are detachably joined together by bolts 27 passed through openings 28 in lugs 29 on the sections, such bolts at one end having heads 30 and at the other end having nuts 31 screw threaded thereon, which heads and bolts abut the respective adjacent lugs. Said clamping rings 25 are adapted to be drawn tightly together in any suitable manner thereby compressing the coupling sleeve 19 about the pipe lengths or sections and it will be realized that such contraction will through the coaction of the tapered surfaces between the pipe lengths or sections and coupling sleeve at the interior of the latter impart a movement longitudinally to the pipe sections to draw them together and not only cause the coupling sleeve to intimately fit and embrace the same but to intimately engage the terminal end 14 in the groove 16 and in contact with the wall providing it. To this end, bolts 32 may be passed through openings 33 at suitable intervals in the clamping rings, such bolts being of conventional form having heads 34 at one end and nuts 35 screwed on the other end.

Various changes may be resorted to provided they fall within the spirit and scope of the invention and for instance as shown in Figure 4 where the screw threads of bolt 32, here designated 36 are engaged with screw threads in the opening 37 of the adjacent clamp rings 38. Otherwise the form of Figure 4 corresponds exactly with that first described.

A clamping ring may be of different forms. In lieu of that at 19 having a single split, such ring may be in two parts or have two splits as at 20' in Figure 5. Internally and externally, the coupling sleeve of Figure 5 corresponds identically with that used in the form of Figures 1 to 4 and the same reference characters have otherwise been applied thereto.

In Figure 6, the modified form of coupling sleeve has a single split therethrough as at 20a, the same being on a bias rather than diametric as in Figure 3. This coupling sleeve of Figure 6 if desired may also be in two parts with two slits or splits like 20a, corresponding to the splits at 20' in Figure 5, but with both splits 20a on a bias but preferably parallel to each other.

I claim as my invention:

1. In combination with pipe ends, one of said ends having an externally reduced extension, the other end being cut away and having a shoulder, said extension being longer than said cut-away portions whereby it functions to bridge and space said ends to provide a reservoir for a sealing medium, external coupling means for said ends bridging and closing said reservoir, consisting of a split sleeve having diverging tapered portions, and clamping elements movable along said portions to contract the split sleeve.

2. In combination with pipe ends, one of said ends having an externally reduced extension, the other end being cut away and having a shoulder, said extension being longer than said cut-away portions whereby it functions to bridge and space said ends to provide a reservoir for a sealing medium, external coupling means for said ends bridging and closing said reservoir, consisting of a split sleeve, and clamping elements movable along said portions to contract the split sleeve, said split sleeve and pipe ends having surfaces in engagement at diverging angles effective to draw the pipe ends toward each other.

3. In combination with pipe ends, one of said ends having an externally reduced extension, the other end being cut away and having a shoulder, said extension being longer than said cut-away portions whereby it functions to bridge and space said ends to provide a reservoir for a sealing medium, external coupling means for said ends bridging and closing said reservoir, consisting of a split sleeve, and clamping elements movable along said portions to contract the split sleeve, said split sleeve and pipe ends having surfaces in engagement at diverging angles effective to draw the pipe ends toward each other, and said coupling sleeve having an internally extending rib of less depth than the reservoir and partly occupying the latter, said rib being annular and having opposite sides contacting adjacent walls of the pipe ends.

4. In combination with pipe ends, one of said ends having an externally reduced extension, said extension being longer than said cut-away portions whereby it functions to bridge and space said ends to provide a reservoir for a sealing medium, external coupling means for said ends bridging and closing said reservoir, consisting of a split sleeve and clamping elements movable along said portions to contract the split sleeve, said split sleeve and pipe ends having surfaces in engagement at diverging angles effective to draw the pipe ends toward each other, and said coupling sleeve having an internally extending rib of less depth than the reservoir and partly occupying the latter, said rib being annular and having opposite sides contacting the adjacent walls of the pipe ends.

JOHN W. STAGGERS.